United States Patent Office 2,839,715
Patented June 17, 1958

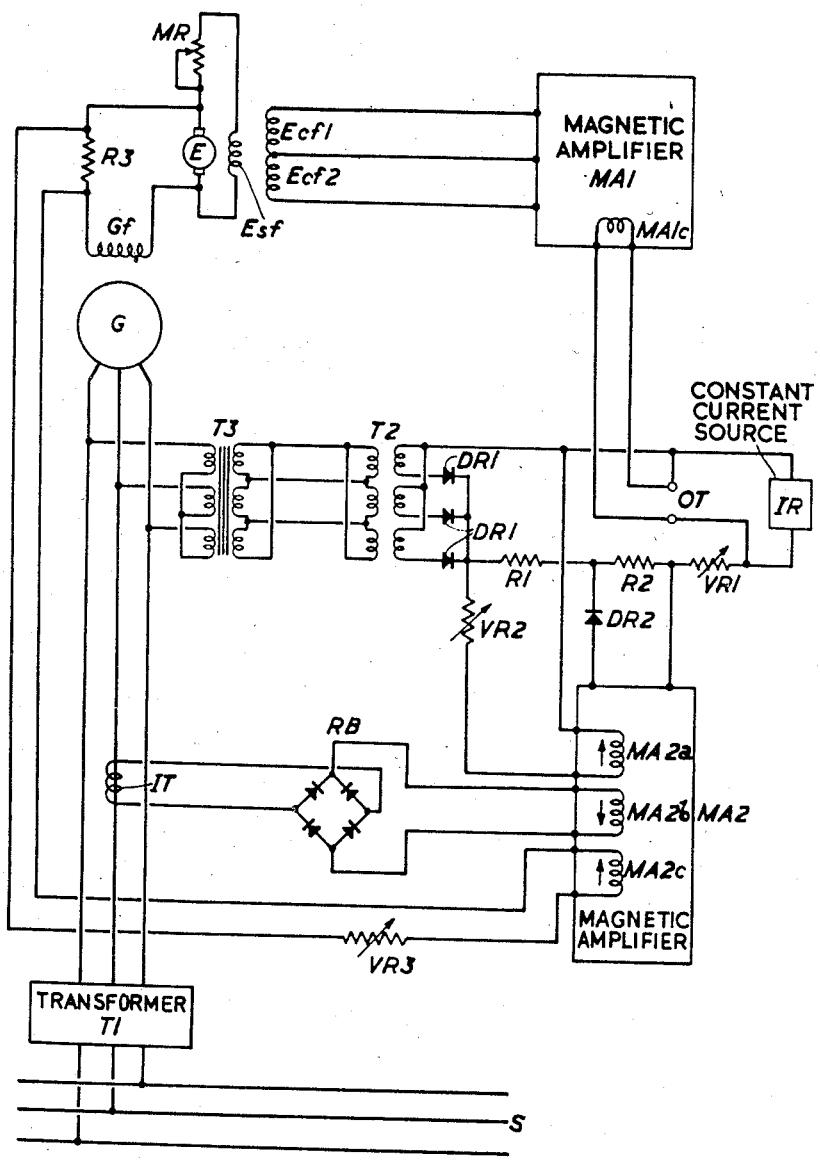

2,839,715

REGULATING SYSTEMS FOR DYNAMO ELECTRIC MACHINES

Norman Harry Shaw, Stafford, England, assignor to The English Electric Company Limited, London, England, a British company Application June 6, 1955, Serial No. 513,497

Claims priority, application Great Britain June 16, 1954

3 Claims. (Cl. 322—25)

This invention relates to regulating systems for synchronous generators of the kind including an automatic voltage regulator arranged to control the excitation of the generator automatically so as to maintain the output voltage of the generator substantially constant.

It is well known that in such systems the synchronising torque of the generator may, under certain conditions, fall below that necessary to maintain the generator in synchronism with the system to which it is connected. This loss of synchronising torque may be due, for example, to the action of the automatic voltage regulator which, in attempting to maintain the generator output voltage constant with sudden loss of load, reduces the generator excitation below the stability limit.

One object of the present invention is to provide an improved regulating system which incorporates means for automatically preventing reduction of the generator excitation below the stability limit.

According to the invention, a regulating system for a synchronous generator comprises, in combination, means for supplying exciting current to the generator, means for producing a first electrical control signal dependent on generator output voltage, means for producing an electrical reference signal, circuit means for comparing the two signals and for producing an output signal in accordance with the difference, amplifying means responsive to said output signal arranged to control said exciting current supplying means so as to vary the generator excitation in a corrective sense in accordance with said output signal, means for producing a second electrical control signal dependent on the magnitude of generator load current, means for producing a third electrical control signal dependent on generator exciting current, and a magnetic amplifier having first, second and third control windings energized in accordance with said first, second and third electrical control signals respectively, the second control winding being arranged to oppose the other two control windings, and an output winding connected to said circuit means so as to inject an overriding control signal into said circuit means in a sense to cause the output signal to boost the generator excitation when the energization of said second control winding exceeds the combined energization of the other two control windings.

Other features of the invention will appear from the following description with reference to the accompanying drawing which shows the simplified circuit diagram of a regulating system for a turbo generator embodying the invention in preferred form.

Referring now to the drawing the generator G supplies the three phase system busbars S through a step-up transformer T1, the field winding Gf of the generator being supplied from an exciter E having a self-excited field winding Esf and a control field winding arranged in two mutually opposing sections Ecf1 and Ecf2. The self-excited field winding Esf is connected in circuit with a motor-operated rheostat MR which is remotely controlled through means, not shown, to provide alternative hand control of the generator output voltage, whilst the two sections Ecf1, Ecf2 of the control field winding are supplied from a magnetic amplifier MA1 having a control winding MA1c.

The control winding of the magnetic amplifier MA1 is connected across the output terminals OT of a comparison circuit which is arranged to compare a voltage dependent on the average of the generator line voltages with a voltage drop due to a constant reference current flowing through resistors. The circuit comprises, in series relationship, a constant current reference source IR, the star connected secondary winding of a transformer T2, dry plate rectifiers DR1, loading resistors R1 and R2, and a variable resistor VR1. The delta-connected primary winding of the transformer T2 is supplied from the generator G through a transformer T3 having a star-connected primary winding and a delta-connected secondary winding. The rectified output voltage of the transformer T2 is thus dependent on the average of the generator line voltages.

In operation, the variable resistor VR1 is set so that, at the desired generator output voltage, the total voltage drop across the resistors R1, R2 and VR1 is substantially equal in magnitude and opposite in polarity to the voltage output derived from the rectifiers DR1. Under these conditions no potential difference will appear across the output terminals OT of the comparison circuit, and the control winding MA1c of the magnetic amplifier MA1 will not be energized.

If now the generator output voltage should rise, then since the current in the comparison circuit, and thus the voltage drop across the three resistors therein, is maintained constant, a potential difference will be developed across the output terminals OT which will result in the energization of the control winding MA1c of the magnetic amplifier MA1.

The magnetic amplifier is arranged so that when its control winding is energized in this way the amplifier develops an output which is applied to the section Ecf1 of the control winding on the exciter so as to buck the self-excited winding Esf. The excitation of the generator G, and thus its output voltage, will accordingly be reduced until a balanced condition is restored at which just sufficient potential difference as maintained across the output terminals OT of the comparison circuit to provide sufficient energization of the section Ecf1 of the control winding on the exciter E.

On the other hand, if the generator line volts should fall, a potential difference of opposite polarity will be developed across the output terminals OT of the comparison circuit with a consequent energization in the opposite sense of the control winding MA1c of the magnetic amplifier MA1. Under these conditions the magnetic amplifier energizes the section Ecf2 of the control winding on the exciter E in a sense to boost the self-excited winding Esf and thereby increase the generator output volts until a balanced condition is once more restored.

In order to prevent loss of synchronism a voltage is applied automatically across the resistor R2 in a sense to cause the generator voltage to rise suddenly if the stability limit is approached. This voltage is derived from a magnetic amplifier MA2 and is applied to the resistor R2 through a rectifier DR2. The magnetic amplifier has three control windings MA2a, MA2b and MA2c respectively. Winding MA2a is energized from the comparison circuit in accordance with the rectified output from the transformer T2, i. e. in accordance with the average of the generator line voltages, a variable resistor VR2 being included in circuit with this winding. Winding MA2b is energized through a rectifier bridge RB from a current transformer IT in one line of the generator load circuit, i. e. in accordance with generator load current. Smoothing circuits may be provided for smoothing the D. C. output of the rectifier. Winding MA2c is connected in series with a variable resistor VR3 across a resistor R3 in the excitation circuit of the generator G so as to be energized in accordance with generator excitation. Windings MA2a and MA2c, as shown by the small arrows, act in the same direction, whilst winding MA2b opposes these two windings.

The variable resistors VR2 and VR3 are preset so that, provided the generator load current does not exceed a limit value which varies with the generator excitation, increasing with increase thereof, the winding MA2b will be overcome by the combined effect of the windings MA2a and MA2c and the magnetic amplifier MA2 will be biased back to minimum output. Under these conditions the rectifier DR2 will prevent the flow of reverse current which would otherwise occur as a result of the normal voltage drop across the resistor R2 due to the constant circulating current being greater than the output current from the magnetic amplifier MA2. The magnetic amplifier therefore has no effect on the operation of the comparison circuit.

If, however, the generator load current should exceed such a value that the winding MA2b overcomes the combined effect of the windings MA2a and MA2c, the magnetic amplifier will develop a comparatively large voltage, causing a current to flow in the forward direction through the rectifier DR2 which will increase the voltage across the resistor R2. A potential difference will therefore be developed across the output terminals OT of the comparison circuit which will cause the magnetic amplifier MA1 to energize the boost winding Ecf2 of the exciter E. The excitation of the generator G will therefore be suddenly increased so as to prevent pull-out of the generator.

Similarly if the generator excitation should fall below such a value that the combined effect of the windings MA2a and MA2c is less than that of the winding MA2b, the magnetic amplifier will develop a comparatively large output which will again result in the excitation of the generator being suddenly increased. By adjusting the setting of the variable resistors VR2 and VR3 the magnitude of generator load current in relation to the generator excitation at which the generator excitation is boosted may be varied as desired.

Whilst the control winding MA2a has been shown as being energized in accordance with the generator voltage, it could alternatively be supplied from a substantially constant voltage source such as, for example, the voltage drop across the resistor R1. The magnetic amplifiers may of course be replaced by other forms of amplifying devices, such as electronic amplifiers or amplifying exciters.

What I claim as my invention and desire to secure by Letters Patent, is:

1. A regulating system for a synchronous generator comprising, in combination, means for supplying exciting current to the generator, means for producing a first electrical control signal dependent on generator output voltage, means for producing an electrical reference signal, circuit means for comparing the two signals and for producing an output signal in accordance with the difference, amplifying means responsive to said output signal arranged to control said exciting current supplying means so as to vary the generator excitation in a corrective sense in accordance with said output signal, means for producing a second electrical control signal dependent on the magnitude of generator load current, means for producing a third electrical control signal dependent on generator exciting current, and a magnetic amplifier having first, second and third control windings energized in accordance with said first, second and third electrical control signals respectively, the second control winding being arranged to oppose the other two control windings, and an output winding connected to said circuit means so as to inject an overriding control signal into said circuit means in a sense to cause the output signal to boost the generator excitation when the energization of said second control winding exceeds the combined energization of the other two control windings.

2. A regulating system according to claim 1, wherein the means for producing said second electrical control signal comprises a current transformer in the generator load circuit, rectifying means being included between said transformer and said second control winding on the magnetic amplifier.

3. A regulating system according to claim 1, wherein the means for producing the third electrical control signal comprises a resistor in the excitation circuit of the generator.

References Cited in the file of this patent

UNITED STATES PATENTS 2,459,640     Griscom et al. _____ Jan. 18, 1949
2,602,154     Sikorra _____ July 1, 1952